United States Patent [19]
Tom

[11] Patent Number: 5,917,140
[45] Date of Patent: Jun. 29, 1999

[54] SORBENT-BASED FLUID STORAGE AND DISPENSING VESSEL WITH ENHANCED HEAT TRANSFER MEANS

[75] Inventor: Glenn M. Tom, New Milford, Conn.

[73] Assignee: Advanced Technology Materials, Inc., Danbury, Conn.

[21] Appl. No.: 08/859,170

[22] Filed: May 20, 1997

Related U.S. Application Data

[60] Provisional application No. 60/018,044, May 21, 1996, and provisional application No. 60/018,021, May 21, 1996.

[51] Int. Cl.$^6$ .................................................. B01D 53/04
[52] U.S. Cl. ................................. 96/143; 96/146; 96/147; 96/152; 55/524
[58] Field of Search .............................. 96/108, 126–128, 96/130, 143, 146, 147, 152, 112; 55/524

[56] References Cited

U.S. PATENT DOCUMENTS

| | | | |
|---|---|---|---|
| 1,989,206 | 1/1935 | Magill | 96/108 |
| 3,197,945 | 8/1965 | Zaphiropoulos | 96/126 X |
| 3,323,288 | 6/1967 | Cheung et al. | 96/126 X |
| 3,734,293 | 5/1973 | Biskis | 96/126 X |
| 4,026,680 | 5/1977 | Collins | 96/126 X |
| 4,088,456 | 5/1978 | Giorgi et al. | 96/127 |
| 4,581,049 | 4/1986 | Januschkowetz | 96/126 |
| 4,723,967 | 2/1988 | Tom | 96/108 X |
| 4,738,693 | 4/1988 | Tom | 96/108 X |
| 4,942,019 | 7/1990 | Goodell et al. | 96/108 X |
| 5,169,413 | 12/1992 | Leavitt | 96/130 X |
| 5,238,469 | 8/1993 | Briesacher et al. | 96/108 X |
| 5,268,022 | 12/1993 | Garrett et al. | 96/130 X |
| 5,518,528 | 5/1996 | Tom et al. | 95/103 |
| 5,520,721 | 5/1996 | Fraysse et al. | 96/126 X |
| 5,607,499 | 3/1997 | Garrett | 96/108 |
| 5,624,477 | 4/1997 | Armond | 96/112 X |
| 5,704,965 | 1/1998 | Tom et al. | 96/126 X |

FOREIGN PATENT DOCUMENTS

| | | | |
|---|---|---|---|
| 54-035994 | 11/1979 | Japan | 96/127 |
| 55-092122 | 7/1980 | Japan | 96/126 |
| 62-123001 | 6/1987 | Japan | 96/126 |
| 62-210031 | 9/1987 | Japan | 96/127 |

*Primary Examiner*—Robert Spitzer
*Attorney, Agent, or Firm*—Steven J. Hultquist; Oliver A.M. Zitzmann

[57] ABSTRACT

An apparatus, for storage and dispensing of a sorbable fluid, including a storage and dispensing vessel containing a solid-phase physical sorbent medium for holding a sorbable fluid, with heat transfer means being associated with the vessel for thermally managing heat effects due to adsorption and desorption of the sorbable fluid.

13 Claims, 3 Drawing Sheets

SORBENT-BASED FLUID STORAGE AND DISPENSING VESSEL WITH ENHANCED HEAT TRANSFER MEANS

CROSS REFERENCE TO RELATED APPLICATIONS

This application is based on and claims the priority of United States Provisional patent application No. 60/018,044 filed May 21, 1996 and United States Provisional patent application No. 60/018,021 filed May 21, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to system of such type in which the storage and dispensing vessel is augmented with internal heat transfer means.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

In the contacting of the sorbent medium in the storage and dispensing vessel with the sorbable fluid for loading thereof on and in the sorbent medium, the heat effects of the sorption are significant. In the case of a sorbent such as a zeolite or a carbon sorbent material, in which arsine is the sorbate fluid, the heat of adsorption causes a temperature rise which in some instances may be on the order of 100 degrees Centigrade or even higher. As a result, the sorbate-loaded sorbent-containing storage and dispensing vessel must be cooled for a substantial period of time. e.g., 12–24 hours after sorbable fluid filling. This thermal equilibration timeframe is a significant disadvantage in the manufacturing process, limiting the volume of storage and dispensing systems which can be produced, since thermal equilibration typically must be completed before top-off fill of the sorbate, and completion of the fabrication of the storage and dispensing system.

It would therefore be a significant advance in the art, and is accordingly an object of the present invention, to provide a means and method to ameliorate and reduce the thermal equilibration period in the manufacture of the storage and dispensing systems of the above-described type.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the sorbent material.

Thermal desorption of the sorbable fluid may be effected by heating the sorbent medium. Pressure-mediated desorption of the sorbable fluid may be effected by establishing an exterior pressure level at the dispensing point which is lower than the interior gas pressure of the vessel, so that the pressure differential causes fluid to desorb from the sorbent medium and to flow out of the vessel to the dispensing point. Alternatively, pumping or suction on the interior volume of the vessel may be employed to extract the sorbable fluid from the vessel.

The sorbent medium in the storage and dispensing system may include any suitable sorbent material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kureha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

The invention in one aspect thereof relates to an apparatus for storage and dispensing of a sorbable fluid, including a storage and dispensing vessel containing a solid-phase physical sorbent medium for holding a sorbable fluid, with heat transfer means being associated with the vessel for thermally managing heat effects due to adsorption and desorption of the sorbable fluid.

The invention is based on the fact that the sorbent material in the storage and dispensing vessel when provided in a typical form of a bed of particulate or otherwise divided solids, gives rise to a significant void space comprising the interstitial void volume of the bed. Such void volume affords significant thermal resistance to heat transfer when the sorbent is contacted with the sorbate fluid and the resulting heat of adsorption raises the bed temperature substantially.

By providing a heat transfer structure in the vessel interior volume, in heat transfer contact with the vessel walls, it is possible to effectively distribute the heat from the interior regions of the sorbent bed to the walls. The walls of the vessel thus afford a high rate of heat dissipation, by radiative, convective, and conductive heat transfer to the ambient environment of the vessel.

The invention therefore contemplates an apparatus for storage and dispensing of a sorbable fluid, including a storage and dispensing vessel constructed and arranged to contain a solid-phase physical sorbent holding a sorbable fluid physically adsorbed thereon, and heat transfer means disposed in the vessel for thermally equilibrating the apparatus against the heat of adsorption and desorption.

The apparatus may suitably comprise a dispensing assembly coupled in gas flow communication with the storage and dispensing vessel, and constructed and arranged:

(I) to effect pressure-mediated desorption of sorbable fluid from the solid-phase physical sorbent medium, and fluid flow of desorbed fluid through the dispensing assembly; and/or (II) to effect thermally-mediated desorption of sorbable fluid from the solid-phase physical sorbent medium, and fluid flow of desorbed fluid through the dispensing assembly.

The heat transfer means may for example include at least one heat transfer structure in contact with an inner surface of the vessel to dissipate heat to the ambient environment of the vessel, e.g., at least one conductive heat transfer element abutting an inner surface of the vessel, and preferably a multiplicity of conductive heat transfer elements each of which is secured to an inner surface of the vessel. Such conductive heat transfer elements may for example be welded, brazed, bonded or soldered to an inner surface of the vessel.

The fluid storage and dispensing vessel of the invention may further comprise extended heat transfer surface structure disposed on an exterior surface of the vessel to facilitate the transfer of heat of adsorption from the vessel. Such external heat transfer surface structure may for example be arranged for connection to a source of heat exchange medium, such as heating or cooling fluid, depending on whether exothermic or endothermic conditions obtain in the sorbent material bed in the interior volume of the vessel. Exterior heat transfer surface structure may be provided comprising heat transfer fins.

In another aspect, the storage and dispensing vessel of the invention may utilize as the heat transfer means a thin film coating on an interior surface of the vessel to provide a barrier to outgassing in use of the vessel. Such thin film coating may comprise an inert material. The thin film coating may be deposited by vapor deposition, solution deposition, or other suitable method. The thin film coating may by way of example be a gold coating, a diamond coating, a diamond-like material coating, or a silicon carbide coating. The coating may be formed from an initial precursor coating which is applied on interior surfaces of the vessel and then reacted to form in situ a final film coating.

The present invention provides an apparatus for storage and dispensing of a fluid, comprising a storage and dispensing vessel containing an adsorbent material for holding a sorbable fluid, with means for selectively dispensing desorbate fluid from the vessel, wherein the vessel comprises (i)

interiorly disposed heat transfer structure for modulating thermal effects incident to sorption of the sorbable fluid on the adsorbent material and desorption of sorbable fluid from the adsorbent material, and/or (ii) exteriorly disposed heat transfer structure for further modulating thermal effects incident to sorption of the sorbable fluid on the adsorbent material and desorption of sorbable fluid from the adsorbent material.

Other aspects and features of the invention will be more fully apparent from the ensuing disclosure.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. Pat. No. 5,704,965 issued Jan. 6, 1998 in the names of Glenn M. Tom and James V. McManus for "FLUID STORAGE AND DELIVERY SYSTEM UTILIZING CARBON SORBENT MEDIUM," hereby are incorporated herein by reference in their entirety.

In the ensuing disclosure, the invention will be described with reference to a gas as the sorbate fluid, however, it will be recognized that the invention is broadly applicable to liquids gases, vapors, and multiphase fluids, and contemplates storage and dispensing of fluid mixtures as well as single component fluids.

Figure 1:
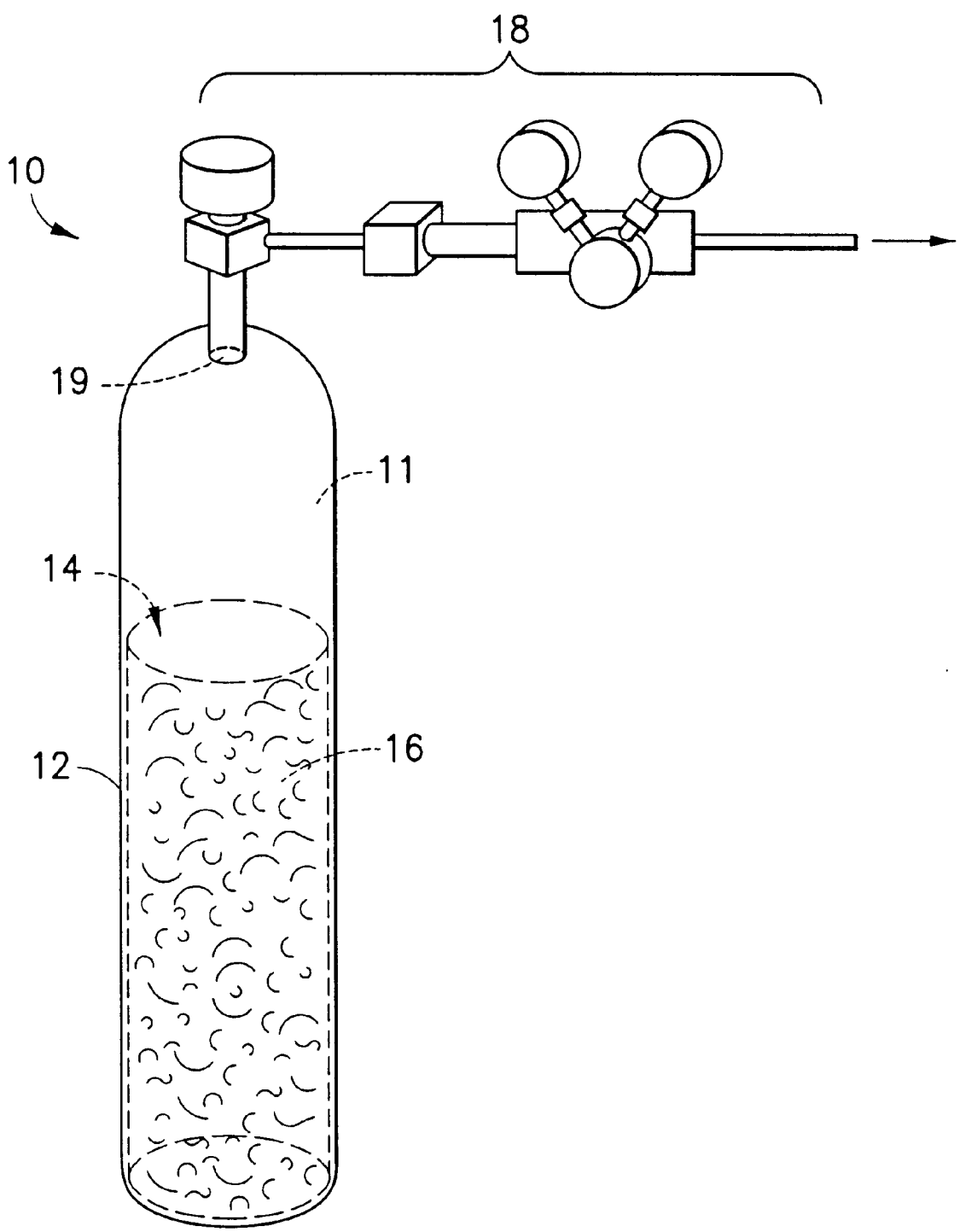
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may be provided with internal heating means (not shown) which serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other. Pressure-mediated desorption of the fluid from the sorbent material may also be effected by pumping or exertion of vacuum or suction conditions on the interior volume of the vessel, if the exterior pressure is otherwise not lower than the pressure in the interior volume of the vessel, in the absence of pump or suction means.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Figure 2:
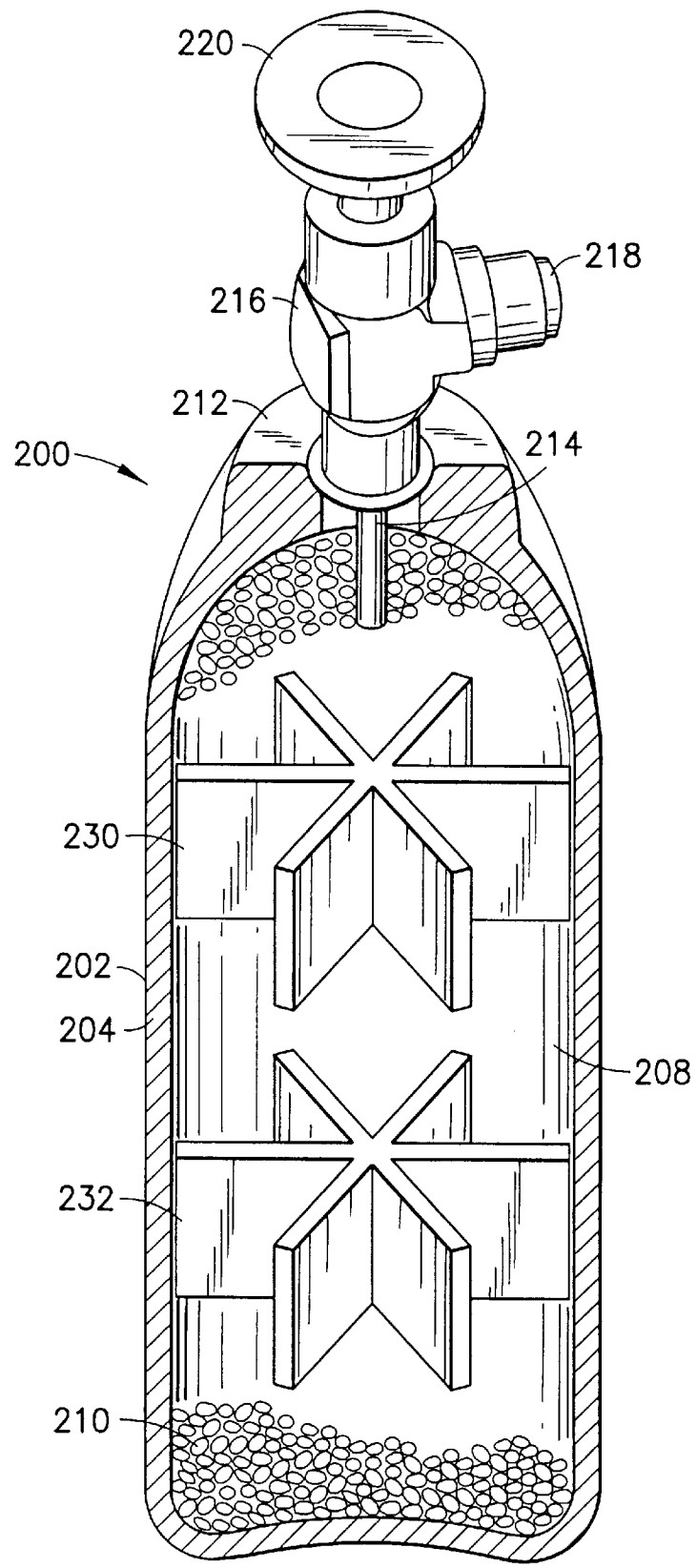
FIG. 2 is a schematic perspective view, in partial cross-section, of a storage and dispensing vessel according to one embodiment of the present invention.

Referring now to FIG. 2, there is shown a perspective view in partial cross-section, of a storage and dispensing vessel 200 according to one embodiment of the present invention.

The vessel 200 comprises a receptacle member 202 including a bounding wall 204 enclosing an interior volume 208 containing a bed 210 of sorbent material. The vessel at its upper neck portion 212 is joined to a valve head 216 which includes a manually rotatable wheel 220 for selectively opening or closing the valve element (not shown) in the valve head 216, and releasing sorbate fluid to the discharge portion 218 of the valve head. The valve head is joined to porous tube 214 as shown, to preclude the entrainment of fine solids particulates in the fluid during dispensing of same.

Disposed in interior volume 208 of the vessel 200 is an upper heat transfer member 230 including radially extending arms each of which abuts and is secured in heat transfer conductive relationship to the vessel wall 204, e.g., by soldering, welding, brazing, or otherwise bonding the radial extremity of the arm directly to the wall, so that the arm provides a conductive heat transfer path along its radial extent, directly to the circumscribing wall 204.

In like manner, a correspondingly constructed and arranged lower heat transfer member 232 is disposed in the lower portion of the interior volume of the vessel, in conductive heat transfer relationship to the wall.

It will be recognized that the vessel may have additional, and/or differently configured, heat transfer elements deployed therein, for dissipating the heat of adsorption from the interior regions of the sorbent bed, to the bounding wall of the vessel, and for thermally equilibrating the sorbent bed in relation to the thermal effects of desorption of the sorbable fluid from the sorbent material in the bed. It will additionally be appreciated that the heat transfer surface members may be widely varied, from the fin-like spider conformation shown, and may for example comprise mesh elements, fingers, internal heat pipe assemblies, conductive elements joining inner wall surface portions on the opposite outer surface of which is provided exterior extended heat transfer surface members, such as exterior cooling fins, connections for contact with heat exchange fluids (e.g., with interior wall passages through which coolant fluid from an external source can be circulated), etc.

By the provision of the heat transfer structure of the invention, the storage and dispensing vessel is able to dissipate the heat of adsorption when the sorbate is contacted with the sorbent bed, in a shorter time than has heretofore been possible. Accordingly, there is achieved a substantial increase in the volumetric throughput (units/time) of the manufacturing process, so that the productivity of the manufacturing process is thereby greatly increased.

Figure 3:
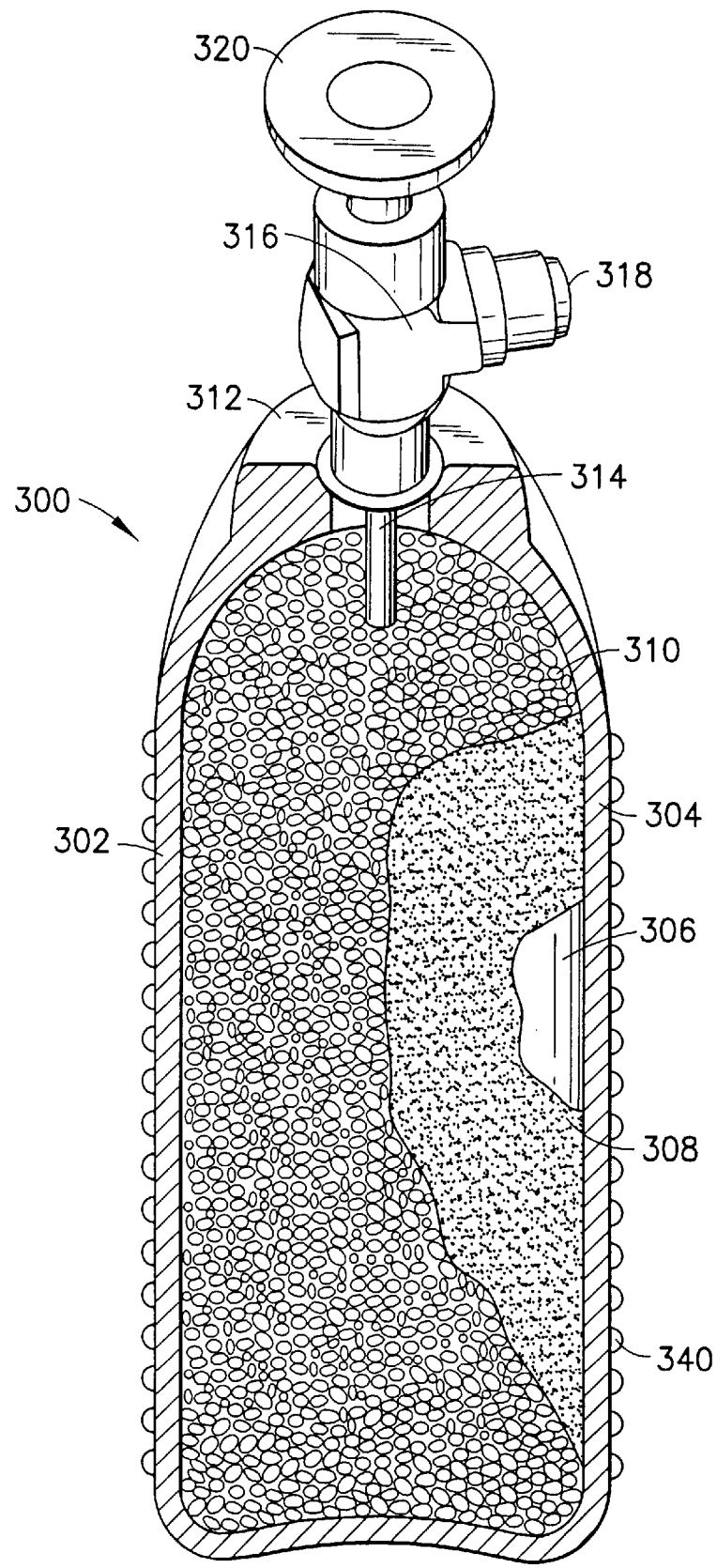
FIG. 3 is a schematic perspective view, in partial cross-section, of a storage and dispensing vessel according to another embodiment of the present invention.

Referring now to FIG. 3, there is shown a perspective view in partial cross-section, of a storage and dispensing vessel 300 according to another embodiment of the present invention.

The vessel 300 comprises a receptacle member 302 including a bounding wall 304 enclosing an interior volume containing a bed 310 of sorbent material. The vessel at its upper neck portion 312 is joined to a valve head 316 which includes a manually rotatable wheel 320 for selectively opening or closing the valve element (not shown) in the valve head 316, and releasing sorbate fluid to the discharge portion 318 of the valve head. The valve head is joined to porous tube 314 as shown, to preclude the entrainment of fine solids particulates in the fluid during dispensing of same.

The vessel 300 is provided in the FIG. 3 embodiment with exterior surface heat transfer fins 340, which serve to dissipate the thermal effects of sorption of the sorbable fluid on the sorbent material in the vessel, particularly when used in combination with interior heat transfer structure as for example of the type shown and described with reference to FIG. 2 herein.

Disposed in interior volume of the vessel 300 on the interior surface 306 of the vessel wall 304 is a thin film coating 308 of gold. The gold thin film may be deposited by vapor deposition or solution deposition (electroless deposition, or electrolytic/electroplating deposition) techniques, or by any other suitable processes or methods, as are well known to those skilled in the art of thin film formation.

Alternatively, the thin film coating 308 may be formed of any other suitable material which is substantially inert to the sorbent and sorbate components of the storage and dispensing assembly, as well as any decomposition products of the sorbate material. For example, the thin film coating may comprise a coating of diamond or diamond-like material, as deposited on the interior surface of the vessel by chemical vapor deposition or other suitable film-forming technique. As a still further alternative, the thin film coating may comprise a coating of silicon carbide, of any of various polytypes thereof, formed by vapor deposition on the interior wall surface of the vessel.

It will be recognized that the thin film coating material may be widely varied in its composition in the broad practice of the present invention, and that the film formation techniques employed are likewise susceptible of extensive variation. Further, it may be desirable in some instances to form an initial precursor coating on the wall interior surface, and then to react the coating material to form in situ the final film composition.

By the provision of the thin film wall coating of the invention, the storage and dispensing vessel is able to be baked out at high temperature in a shorter time than has heretofore been possible, because the inert coating on the interior walls provides a barrier to outgassing in use of the vessel, as well as providing a preexisting barrier to the reaction or dissolution of atmospheric or other gases with the substrate wall material. Accordingly, there is achieved a substantial increase in the volumetric throughput (units/time) of the manufacturing process, so that the productivity of the manufacturing process is thereby greatly increased.

In addition, by the provision of the thin film wall coating of the invention, the stability of the stored gas may be enhanced, since potentially deleterious reactions with the material of the vessel's interior walls will be prevented. An example would be the prevention of the reaction of arsine with steel to form iron arsenides and hydrogen. Although slow, this reaction has been known to create a hazard for workers cleaning emptied and purged gas cylinders that had earlier contained arsine.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. An apparatus for storage and dispensing of a sorbable fluid, including a storage and dispensing vessel defining an interior volume therewithin bounded by wall surface of said vessel, said vessel being constructed and arranged to contain a solid-phase physical sorbent, a sorbable fluid adsorbed on the physical sorbent and stored thereon without flow of fluid into or out of said vessel, at an interior gas pressure not exceeding about one atmosphere, means for selectively dispensing sorbable fluid from the vessel without a substantially simultaneous flow of fluid into the vessel, and a heat transfer structure disposed in the vessel for thermally equilibrating the apparatus against the heat of adsorption and desorption, including a plurality of heat transfer elements at least some of which interconnect one another in a central region of the interior volume of the vessel and extend outwardly from the central region into the physical sorbent.

2. An apparatus according to claim 1, wherein said means for selectively dispensing sorbable fluid from the vessel comprise a dispensing assembly coupled in gas flow communication with the storage and dispensing vessel, and constructed and arranged:

(I) to effect pressure-mediated desorption of the sorbable fluid from the solid-phase physical sorbent, and fluid flow of desorbed fluid through the dispensing assembly; and/or (II) to effect thermally-mediated desorption of the sorbable fluid from the solid-phase physical sorbent, and fluid flow of desorbed fluid through the dispensing assembly.

3. An apparatus according to claim 1, wherein said heat transfer means include at least one heat transfer structure in contact with an inner surface of the vessel to dissipate heat to the ambient environment of the vessel.

4. An apparatus according to claim 1, wherein said heat transfer means include at least one conductive heat transfer element abutting an inner surface of the vessel.

5. An apparatus according to claim 1, wherein said heat transfer structure comprises a multiplicity of interiorly disposed heat transfer assemblies in axially spaced-apart relationship to one another in the interior volume of said vessel.

6. An apparatus according to claim 5, wherein each of the conductive heat transfer elements is secured by welding, brazing, bonding, or soldering to the wall surface of the vessel.

7. An apparatus according to claim 1, further comprising extended heat transfer surface structure disposed on an exterior surface of the vessel to facilitate the transfer of heat of adsorption from the vessel.

8. An apparatus according to claim 7, wherein the heat transfer surface structure is arranged for connection to a source of heat exchange medium.

9. An apparatus according to claim 7, wherein the heat transfer surface structure comprises heat transfer fins.

10. An apparatus according to claim 1, wherein each heat transfer element at an outer extremity thereof is an abutting contact with the wall surface of the vessel.

11. An apparatus for storage and dispensing of a fluid, comprising a storage and dispensing vessel defining an interior volume therewithin bounded by wall surface of said vessel, and containing an adsorbent material, a sorbable fluid adsorbed on the adsorbent material, and stored thereon without flow of fluid into or out of said vessel, at an interior gas pressure not exceeding about one atmosphere, with means for selectively dispensing desorbate fluid from the vessel without a substantially simultaneous flow of fluid into the vessel, said vessel comprising a coating on interior surfaces of the vessel, the coating being selected from the group consisting of gold, diamond, diamond-like material, and silicon carbide.

12. An apparatus for storage and dispensing of a fluid, comprising a storage and dispensing vessel defining an interior volume therewithin bounded by wall surface of said vessel, and containing an adsorbent material, a sorbable fluid adsorbed on the adsorbent material, and stored thereon without flow of fluid into or out of said vessel, at an interior fluid pressure not exceeding about one atmosphere, with means for selectively dispensing desorbate fluid from the vessel without a substantially simultaneous flow of fluid into the vessel, said vessel being of vertically elongate form and comprising multiple interiorly disposed heat transfer structures for modulating thermal effects incident to sorption of the sorbable fluid on the adsorbent material and desorption of sorbable fluid from the adsorbent material, wherein each of said heat transfer structures comprises a plurality of heat transfer elements extending from and contacting one another in a central region of the interior volume of the vessel, with each heat transfer element at an outer extremity thereof being in abutting contact with the wall surface of the vessel, with said heat transfer elements being vertically aligned and vertically elongated, and with the heat transfer structures being longitudinally spaced-apart from one another in said vessel.

13. An apparatus according to claim 12, further comprising exteriorly disposed heat transfer structure for further modulating thermal effects incident to sorption of the sorbable fluid on the adsorbent material and desorption of sorbable fluid from the adsorbent material.

* * * * *